(12) United States Patent
Wan

(10) Patent No.: US 7,632,085 B2
(45) Date of Patent: Dec. 15, 2009

(54) APPARATUS AND METHOD FOR DEMOUNTING MOLD BLOCK

(75) Inventor: Xin Wan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 94 days.

(21) Appl. No.: 11/923,665

(22) Filed: Oct. 25, 2007

(65) Prior Publication Data

US 2008/0152749 A1    Jun. 26, 2008

(30) Foreign Application Priority Data

Dec. 22, 2006    (CN)    ............ 2006 1 0157865

(51) Int. Cl.
*B25B 27/00*    (2006.01)
*B29C 37/00*    (2006.01)

(52) U.S. Cl. .................. 425/182; 29/267; 29/275; 81/3.37; 264/344; 425/190

(58) Field of Classification Search .......... 425/182, 425/190; 264/219, 344; 81/3.27, 3.37, 3.55; 254/21, 22, 131; 7/169; 29/267, 270, 275, 29/282

See application file for complete search history.

(56) References Cited

U.S. PATENT DOCUMENTS

| 111,351 | A | * | 1/1871 | Kirby ................... 81/3.37 |
| 675,921 | A | * | 6/1901 | Bauer .................. 217/111 |
| 740,122 | A | * | 9/1903 | Greenwood ............. 81/3.37 |
| 3,274,675 | A | * | 9/1966 | Jackson ................ 29/267 |
| 4,074,411 | A | * | 2/1978 | Willard et al. ........... 29/267 |
| 5,302,105 | A |   | 4/1994 | Bertleff |
| 5,939,002 | A | * | 8/1999 | Heindel ................ 264/219 |
| 6,578,223 | B1 | * | 6/2003 | Link et al. ............... 7/156 |
| 6,814,906 | B2 |   | 11/2004 | Bergeron et al. |
| 6,991,208 | B1 | * | 1/2006 | Herman ................ 249/166 |
| 7,114,233 | B1 | * | 10/2006 | Wyrick et al. .......... 29/426.5 |

* cited by examiner

*Primary Examiner*—Yogendra Gupta
*Assistant Examiner*—Emmanuel S Luk
(74) *Attorney, Agent, or Firm*—Frank R. Niranjan

(57) ABSTRACT

According to one aspect, an apparatus for demounting a mold block includes a main body, a pivot, and an engaging member. The main body includes a hold portion and a load portion. The pivot is connected to the main body for providing a fulcrum for the main body. The hold portion and the load portion are disposed at two sides of the fulcrum. The engaging member is mounted to the load portion for fixing the mold block to the engaging member. The load portion swings about the fulcrum in a first direction and drives the engaging member to demount the mold block when the hold portion is pressed by a force in a second direction opposite to the first direction.

18 Claims, 7 Drawing Sheets

APPARATUS AND METHOD FOR DEMOUNTING MOLD BLOCK

BACKGROUND

1. Field of the Invention

The present invention generally relates to molding, and more particularly to an apparatus and method for demounting a mold block from a mold.

2. Description of Related Art

Molding is a very popular process in manufacturing to shape pliable raw materials by using a rigid frame or a model called a mold. The mold may be a hollowed-out block that is filled with liquefied plastic, glass, metal, or ceramic raw materials. The liquefied materials harden or set inside the mold, adopting the shape of the mold to become a molded product.

As the structure of the molded product becomes more complex, the process of manufacturing and repairing the mold also becomes complex. In order to simplify the structure of the mold, the mold is partitioned into several mold blocks. That is, the mold is made up of several mold blocks, each of which has a simple structure, so that the complex structure of the mold is simplified. The mold blocks are respectively manufactured and assembled together to form the mold. When one or more of the mold blocks are damaged, the damaged mold blocks are removed and repaired without removing other mold blocks.

Generally, the mold blocks cannot be easily removed, as they are tightly fitted together and great force must be applied when taking out one of the mold block. Referring to FIG. 7, a schematic diagram of a traditional mold block removal tool 99 is illustrated. The tool 99 includes a hold member 910, a guide pole 920, an engaging member 930, and a block member 940. The hold member 910 is slideably supported on the guide pole 920. The engaging member 930 and the block member 940 are disposed at two ends of the guide pole 920 respectively, so that a slidable range of the hold member 910 is limited between the engaging member 930 and the block member 940. The engaging member 930 defines a notch 932 for receiving a screw cap (not shown). In use, the screw cap fastened to a mold block that needs to be removed is received in the notch 932. The hold member 910 is moved along the guide pole 920 from the engaging member 930 toward the block member 940. The block member 940 is knocked by the hold member 910, thus a force for removing the mold block is generated along a direction of the guide pole 920. The mold block is pulled out by the engaging member 930 in the direction of the guide pole 920 accordingly.

In order to generate a large enough knock force, the guide pole 920 must be long enough for the hold member 910 to accelerate to a relatively high speed. However, it is inconvenient to use the tool 99 with a long guide pole 920 especially when an area for using the tool 99 is limited.

Accordingly, a need exists for an apparatus and method resolving the above problem in the industry.

SUMMARY

According to one aspect, an apparatus for demounting a mold block, includes a main body, a pivot, and an engaging member. The main body includes a hold portion and a load portion. The pivot is connected to the main body for providing a fulcrum for the main body. The hold portion and the load portion are disposed at two sides of the fulcrum respectively. The engaging member is mounted to the load portion for fixing the mold block to the engaging member. The load portion swings about the fulcrum in a first direction and drives the engaging member to demount the mold block when the hold portion is pressed by a force in a second direction opposite to the first direction.

Other apparatuses, methods, features, and advantages of the present apparatus and method for demounting mold block will be or become apparent to one with skill in the art upon examination of the following drawings and detailed description. It is intended that all such additional systems, methods, features, and advantages be included within this description, be within the scope of the present apparatus, and be protected by the accompanying claims.

BRIEF DESCRIPTION OF THE DRAWINGS

Many aspects of the present apparatus and method for demounting a mold block can be better understood with reference to the following drawings. The components in the drawings are not necessarily drawn to scale, emphasis instead being placed upon clearly illustrating the principles of the present device. Moreover, in the drawings, like reference numerals designate corresponding parts throughout the several views.

DETAILED DESCRIPTION OF THE EMBODIMENTS

Reference will now be made to the drawings to describe preferred embodiments of a present apparatus and method for demounting a mold block, in detail.

Figure 1:
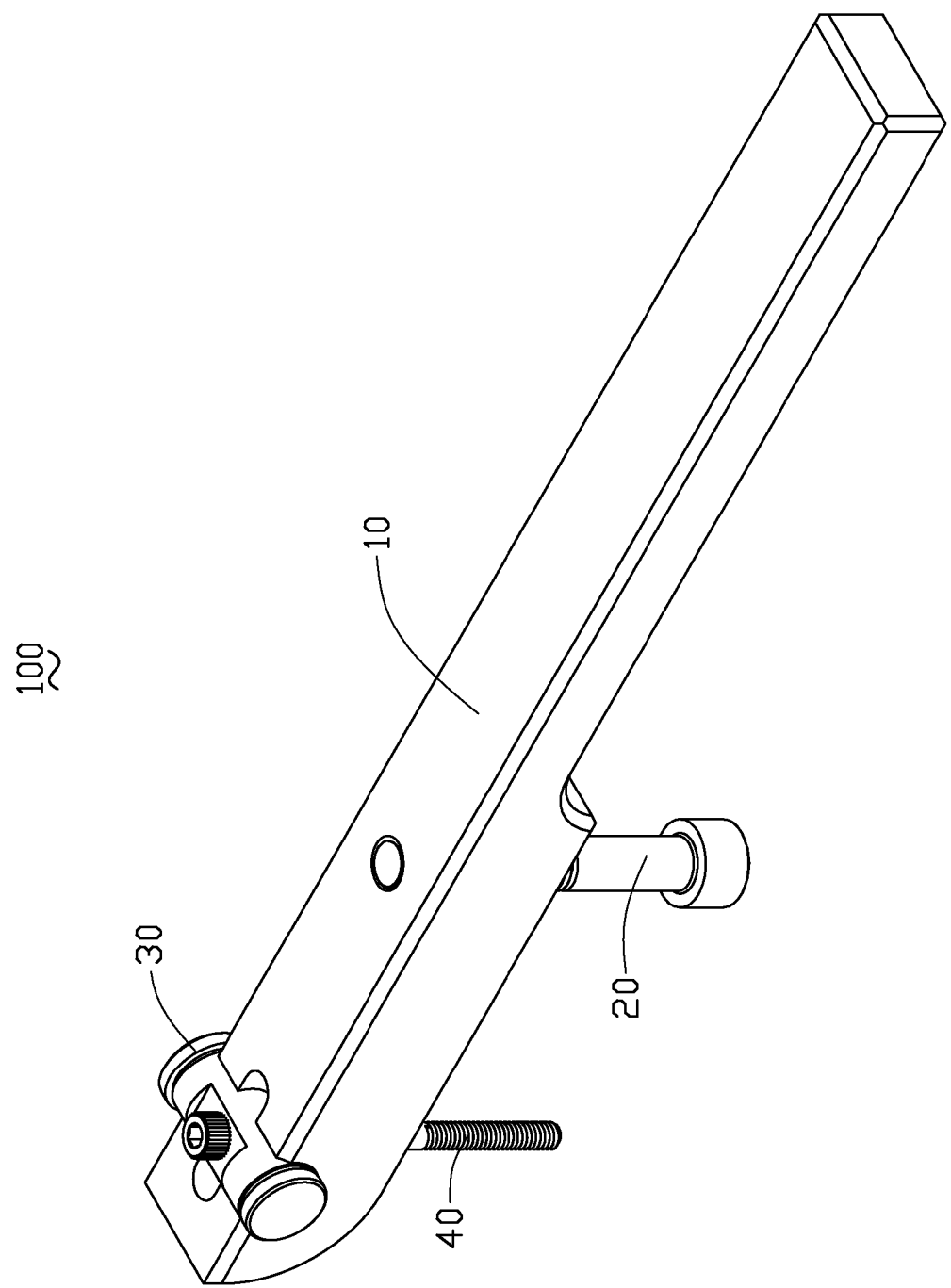
FIG. 1 is an isometric view of a demounting apparatus in accordance with an exemplary embodiment.

Referring to FIG. 1, a demounting apparatus 100 in accordance with an exemplary embodiment is illustrated. The demounting apparatus 100 includes a main body 10, a pivot 20, a rotatable member 30, and an engaging member 40. The pivot 20 is fastened to the middle of the main body 10. The rotatable member 30 is rotatably disposed on an end of the main body 10. The engaging member 40 is inserted into the rotatable member 30 and protrudes through the main body 10.

Figure 2:
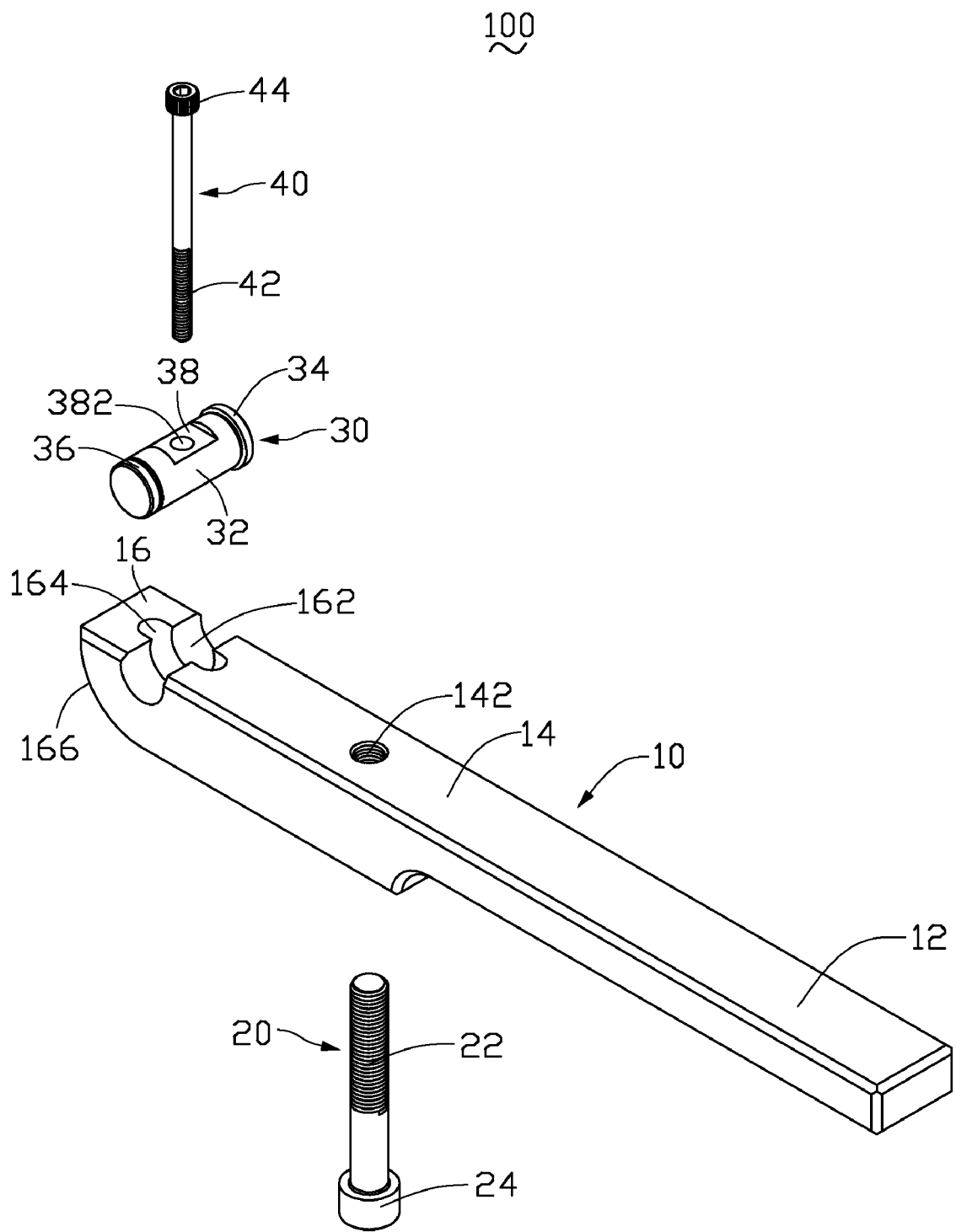
FIG. 2 is an exploded, isometric view of the demounting apparatus of FIG. 1.
Figure 3:
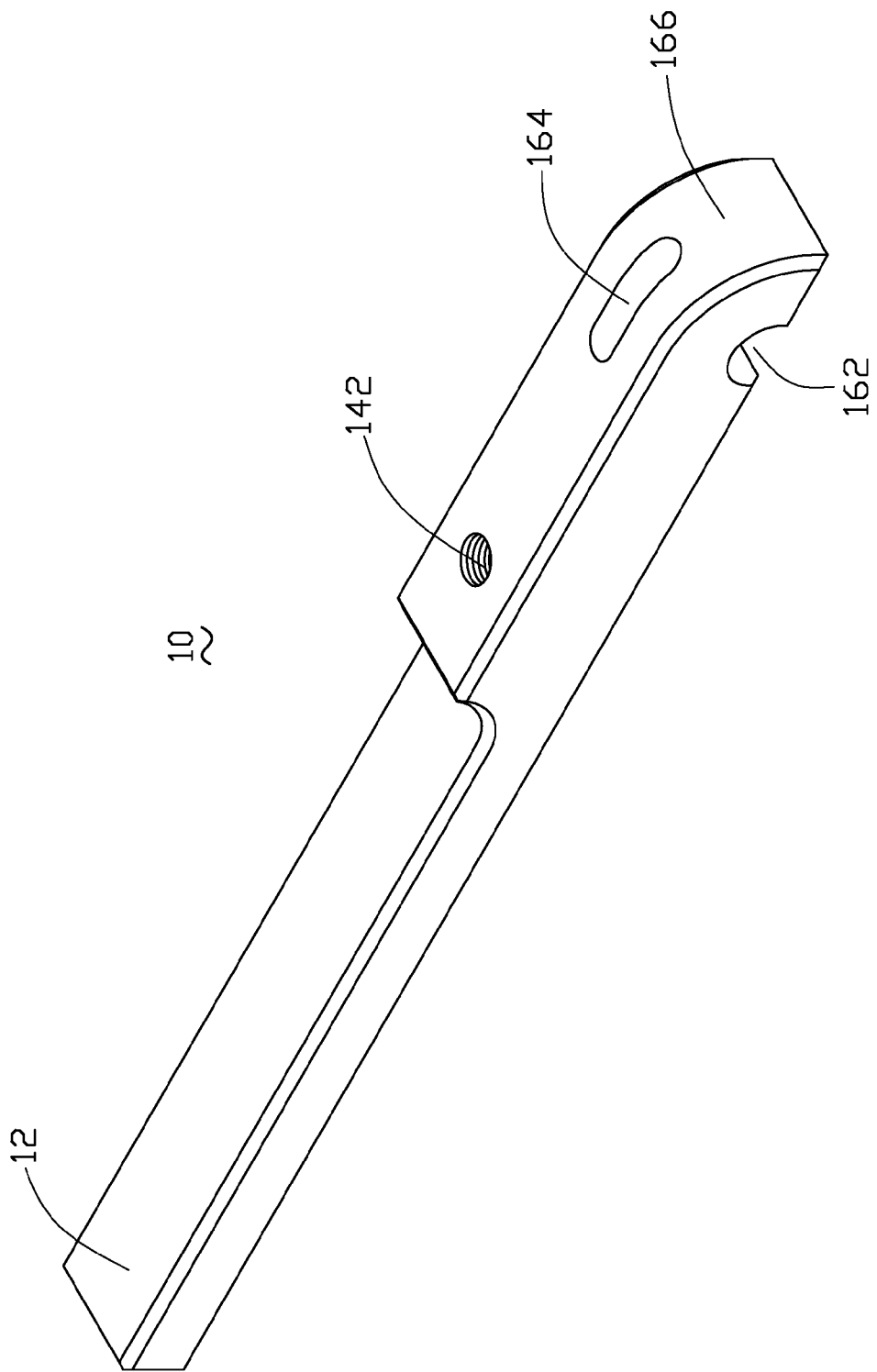
FIG. 3 is an isometric view of a main body in FIG. 1.

Referring also to FIG. 2, the main body 10 is bar shaped and includes a hold portion 12, a fulcrum portion 14, and a load portion 16. A thickness of the hold portion 12 is less than that of the fulcrum portion 14 and the load portion 16. The hold portion 12 is configured for receiving an effort. The fulcrum portion 14 defines a screw hole 142 for the pivot 20 to fasten onto the fulcrum portion 14. An end of the load portion 16 is a plano-convex surface 166 (referring to FIG. 4). A cylindrical depression 162 is defined in the load portion 16 for rotatably receiving the rotatable member 30. The cylindrical depression 162 extends laterally across the load portion 16. A guide slot 164 is defined in the load portion 16. The guide slot 164 communicates with the plano-convex surface 166 and the cylindrical depression 162.

Exemplarily, the pivot 20 is a cap screw and includes a screw pole 22 and a nut 24 formed at one end of the screw pole 22.

The rotatable member 30 is a cylindrical pole. A length of the rotatable member 30 along the axis of the cylindrical pole is greater than the width of the load portion 16, thus two ends of the rotatable member 30 protrude from two lateral sides of the load portion 16 after the rotatable member 30 is disposed in the cylindrical depression 162. The rotatable member 30 includes a cylindrical portion 32, a first side 34, and a second side 36. The first side 34 and the second side 36 are circular and disposed at opposite ends of the cylindrical portion 32 respectively. Either of the diameters of the first side 34 and the second side 36 is greater than that of the cylindrical depression 162, while the diameter of the cylindrical portion 32 is less than that of the cylindrical depression 162. Therefore, the cylindrical portion 32 is able to be rotatably received in the cylindrical depression 162. Meanwhile, the cylindrical portion 32 cannot slide out of the cylindrical depression 162 from two lateral sides of the load portion 16. A flat depression 38 is defined at an upper side of the cylindrical portion 32. The flat depression 38 is parallel to the axis of the rotatable member 30. A through hole 382 is defined in the rotatable member 30 for communicating the guide slot 164 and the center of the flat depression 38. The extending direction of the through hole 382 is perpendicular to the flat depression 38.

The engaging member 40 includes an engaging body 42 and a head 44. The diameter of the engaging body 42 is less than that of the through hole 382. The diameter of the head 44 is greater than that of the through hole 382.

Referring back to FIGS. 1 and 2, a detailed assembly procedure of the demounting apparatus 100 will be described. Firstly, the screw pole 22 of the pivot 20 is screwed into the screw hole 142 for fastening the pivot 20 to the fulcrum portion 14. Secondly, the cylindrical portion 32 of the rotatable member 30 is placed in the cylindrical depression 162. The first side 34 and the second side 36 protrude from two lateral sides of the main body 10. The rotatable member 30 is rotated so that the flat depression 38 is exposed with the through hole 382 aligned with the guide slot 164. Finally, the engaging member 40 is inserted through the through hole 382. The demounting apparatus 100 can be used to demount a mold block.

Figure 4:
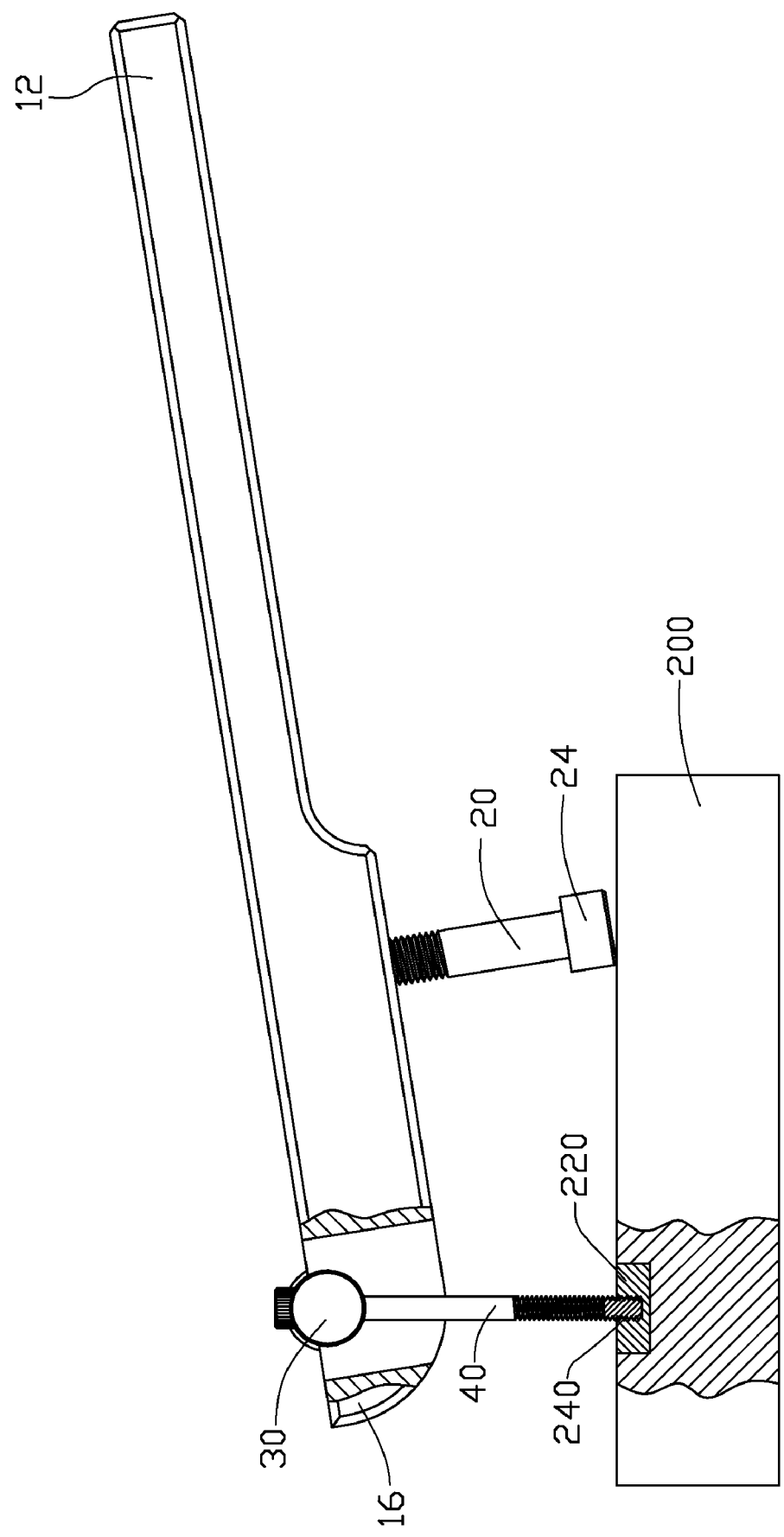
FIG. 4 is a schematic diagram of a first state using the demounting apparatus to demount a mold block.
Figure 5:
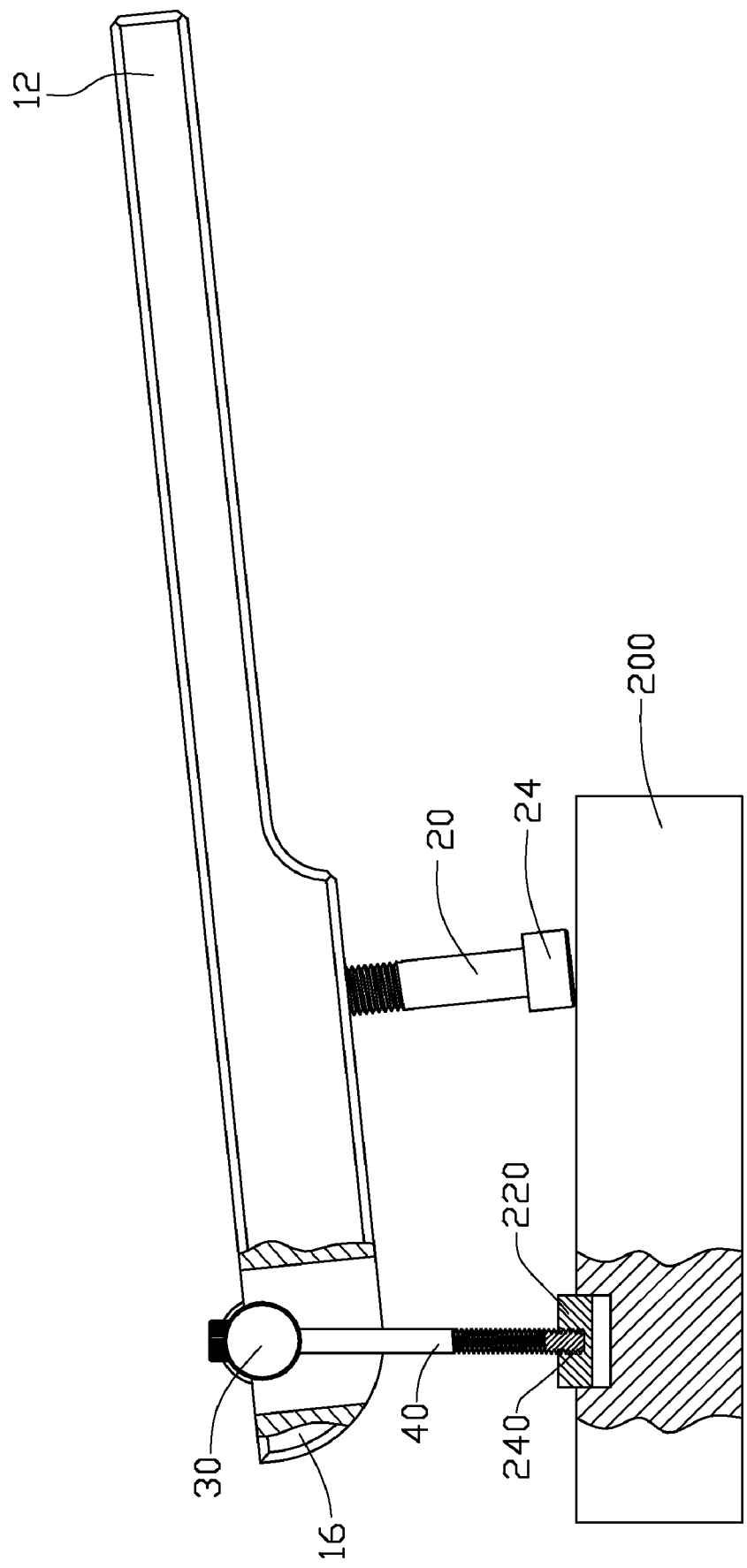
FIG. 5 is a schematic diagram of a second state using the demounting apparatus to demount a mold block.
Figure 6:
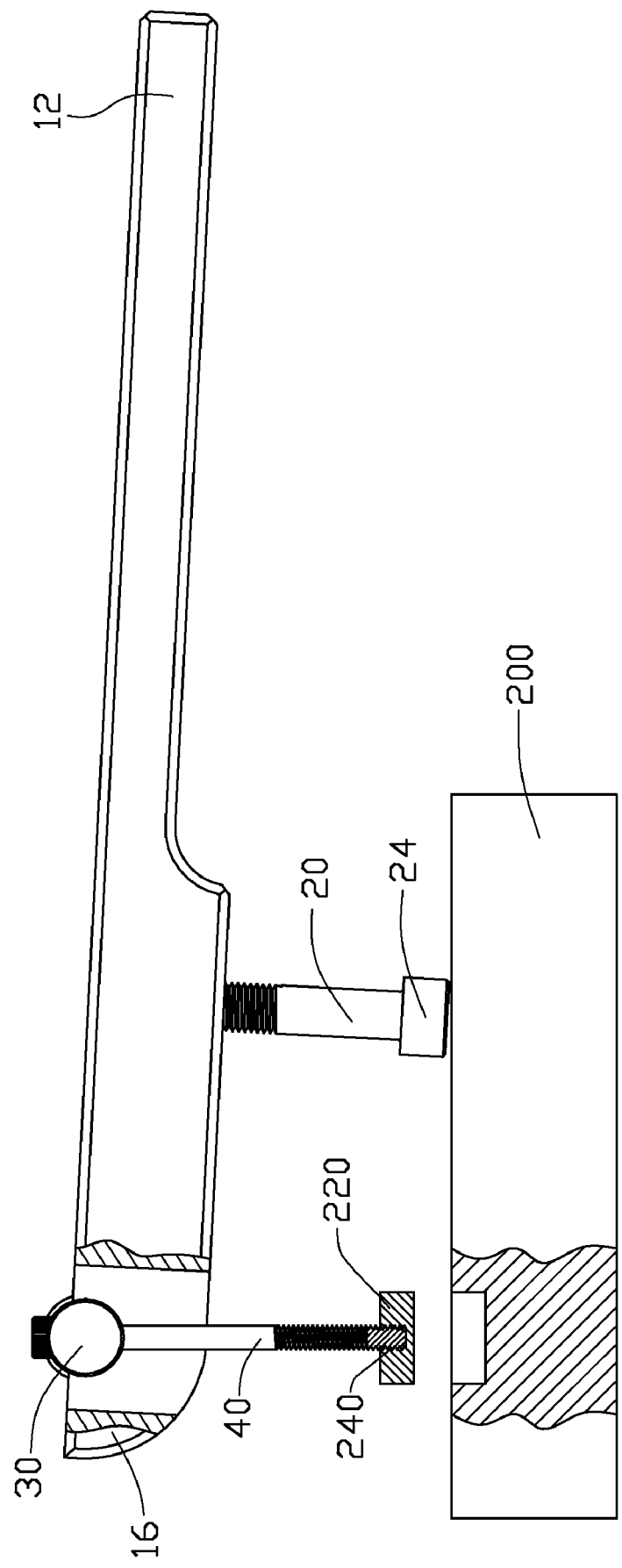
FIG. 6 is a schematic diagram of a third state using the demounting apparatus to demount a mold block.
Figure 7:
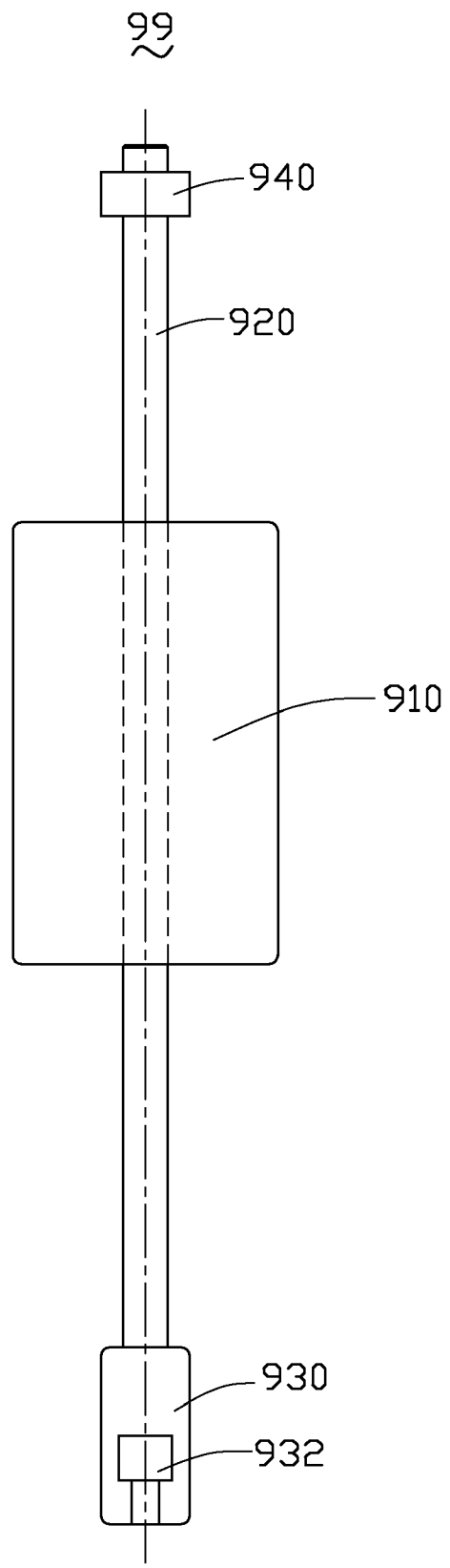
FIG. 7 is a schematic diagram of a traditional tool to demount a mold block.

Referring to FIG. 4 to FIG. 6, schematic diagrams of using the demounting apparatus 100 to demount a mold block 220 from a mold 200 are illustrated. An end of the engaging body 42 of the engaging member 40 is screwed into a screw hole 240 of the mold block 220, thus the mold block 220 is attached to the engaging body 42. The pivot 20 is supported by the mold 200 with the nut 24 contacting the mold 200. The pivot 20 acts as a fulcrum of the main body 10 when the hold portion 12 is engaged by a force in a first direction perpendicular to the mold 200. Thus, the load portion 16 swings about the fulcrum in a second direction opposite to the first direction and overcomes a resistance force between the mold block 220 and the mold 200. When the mold block 220 is being pulled out from the mold 200, the rotatable member 30 rotates with respect to the main body 10 in the cylindrical depression 162 and the engaging body 42 moves in the guide slot 164 keeping the flat depression 38 parallel to the mold 200. Therefore, the engaging body 42 is perpendicular to the mold 200 and the engaging body 42 would not generate pressure on the sidewalls of the mold 200 or the mold block 220.

The demounting apparatus 100 utilizes the principle of leverage, thus the demounting apparatus 100 allows using less effort to demount the mold block 220. In addition, the demounting apparatus 100 does not need to employ a long guide pole, making it convenient to remove the mold block 220 in confined or limited elbow room.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An apparatus for demounting a mold block, the apparatus comprising:
   a main body, the main body comprising a hold portion and a load portion, the load portion defining a cylindrical depression;
   a rotatable member being a cylindrical portion located in the cylindrical depression, the rotatable member having a flat depression and through hole defined in the rotatable member at the center of the flat depression and perpendicular to the flat depression;
   a pivot connected to the main body for providing a fulcrum for the main body, the hold portion and the load portion being disposed at two sides of the fulcrum respectively; and
   an engaging member passing through the through hole for fixing the mold block to the engaging member, the load portion swinging about the fulcrum in a first direction and driving the engaging member to demount the mold block when the hold portion is pressed by a force in a second direction opposite to the first direction.

2. The apparatus as claimed in claim 1, wherein the rotatable member further comprises a first side and a second side, either of the diameters of the first side or the second side is greater than that of the cylindrical depression.

3. The apparatus as claimed in claim 1, wherein the engaging member comprises an engaging body passing through the through hole and a head mounted on the flat depression.

4. The apparatus as claimed in claim 3, wherein the engaging body is configured for fastening the mold block via screwing into a screw hole of the mold block.

5. The apparatus as claimed in claim 3, wherein a guide slot is defined at the load portion for the engaging body to swing in the guide slot when the rotatable member rotates with respect to the main body.

6. The apparatus as claimed in claim 1, wherein the main body further comprises a fulcrum portion defining a screw hole for receiving the pivot.

7. The apparatus as claimed in claim 6, wherein a thickness of the hold portion is less than that of the fulcrum portion and the load portion.

8. The apparatus as claimed in claim 6, wherein the pivot comprises a screw pole screwed to the screw hole for fastening the pivot to the main body.

9. The apparatus as claimed in claim 1, wherein the main body is bar shaped.

10. An apparatus for demounting molds, the apparatus comprising:

a main body comprising a hold portion and a load portion, the load portion defining a cylindrical depression at a first surface of the load portion and a guide slot communicating with the cylindrical depression and a second surface of the load portion opposite to the first surface;

a fulcrum mounted to the main body;

a rotatable member having a cylindrical portion located in the cylindrical depression, the rotatable member defining a through hole passing through and being perpendicular to a center axis of the cylindrical portion; and an engaging member passing through the through hole of the rotatable member and the guide slot of the main body for fixing the mold block to the engaging member, the engaging member swinging in the guide slot when the rotatable member rotates around the fulcrum with respect to the main body.

11. The apparatus as claimed in claim 10, wherein the cylindrical depression extends laterally across the load portion.

12. The apparatus as claimed in claim 11, wherein the rotatable member further comprises a first side and a second side disposed at opposite ends of the cylindrical portion respectively, a diameter of either of the first side or the second side is greater than that of the cylindrical depression.

13. The apparatus as claimed in claim 12, wherein the first side and the second side exteriorly abutted against two lateral sides of the load portion respectively.

14. The apparatus as claimed in claim 10, wherein the engaging member comprises an engaging body passing through the through hole of the rotatable member and a head mounted on the rotatable member.

15. The apparatus as claimed in claim 14, wherein the engaging body has a screw portion for fastening to screw holes of the molds.

16. The apparatus as claimed in claim 10, wherein the main body further comprises a fulcrum portion defining a screw hole for receiving a screw portion the fulcrum.

17. The apparatus as claimed in claim 10, wherein a thickness of the hold portion is less than that of the fulcrum portion and the load portion.

18. The apparatus as claimed in claim 10, wherein the load portion has a plano-convex end.

* * * * *